(12) United States Patent
Walsh et al.

(10) Patent No.: US 8,014,797 B2
(45) Date of Patent: *Sep. 6, 2011

(54) LOCATION INFORMATION SYSTEM FOR A WIRELESS COMMUNICATION DEVICE AND METHOD THEREFORE

(75) Inventors: Patrick J. Walsh, Bloomingdale, IL (US); Kevin Daniel Kaschke, Hoffman Estates, IL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 8 days.

This patent is subject to a terminal disclaimer.

(21) Appl. No.: 12/557,965

(22) Filed: Sep. 11, 2009

(65) Prior Publication Data

US 2010/0003962 A1 Jan. 7, 2010

Related U.S. Application Data

(63) Continuation of application No. 10/454,363, filed on Jun. 3, 2003, now Pat. No. 7,606,555, which is a continuation of application No. 09/497,954, filed on Feb. 4, 2000, now Pat. No. 6,603,977.

(51) Int. Cl.
*H04W 24/00* (2009.01)

(52) U.S. Cl. .............. 455/457; 455/41.3; 455/456.3; 455/456.6; 455/404.2

(58) Field of Classification Search ........ 455/41.2–41.3, 455/456.1–456.6, 457
See application file for complete search history.

(56) References Cited

U.S. PATENT DOCUMENTS 6,032,035 A * 2/2000 Webster et al. ............ 455/404.2
6,061,561 A * 5/2000 Alanara et al. ............ 455/456.1

* cited by examiner

*Primary Examiner* — Simon Sing
(74) *Attorney, Agent, or Firm* — Parks IP Law LLC; Mickki D. Murray, Esq.

(57) ABSTRACT

The present application is directed to location information systems for wireless communication devices. In one implementation, a location information system sends location information to a wireless communication device present in a predetermined area in a facility over a short-range wireless communication channel. The location information informs the wireless communication device a location of the wireless communication device in the facility. The location information system sends the location information to the wireless communication device from a location in the facility other than the location of the wireless communication device in the facility.

20 Claims, 10 Drawing Sheets

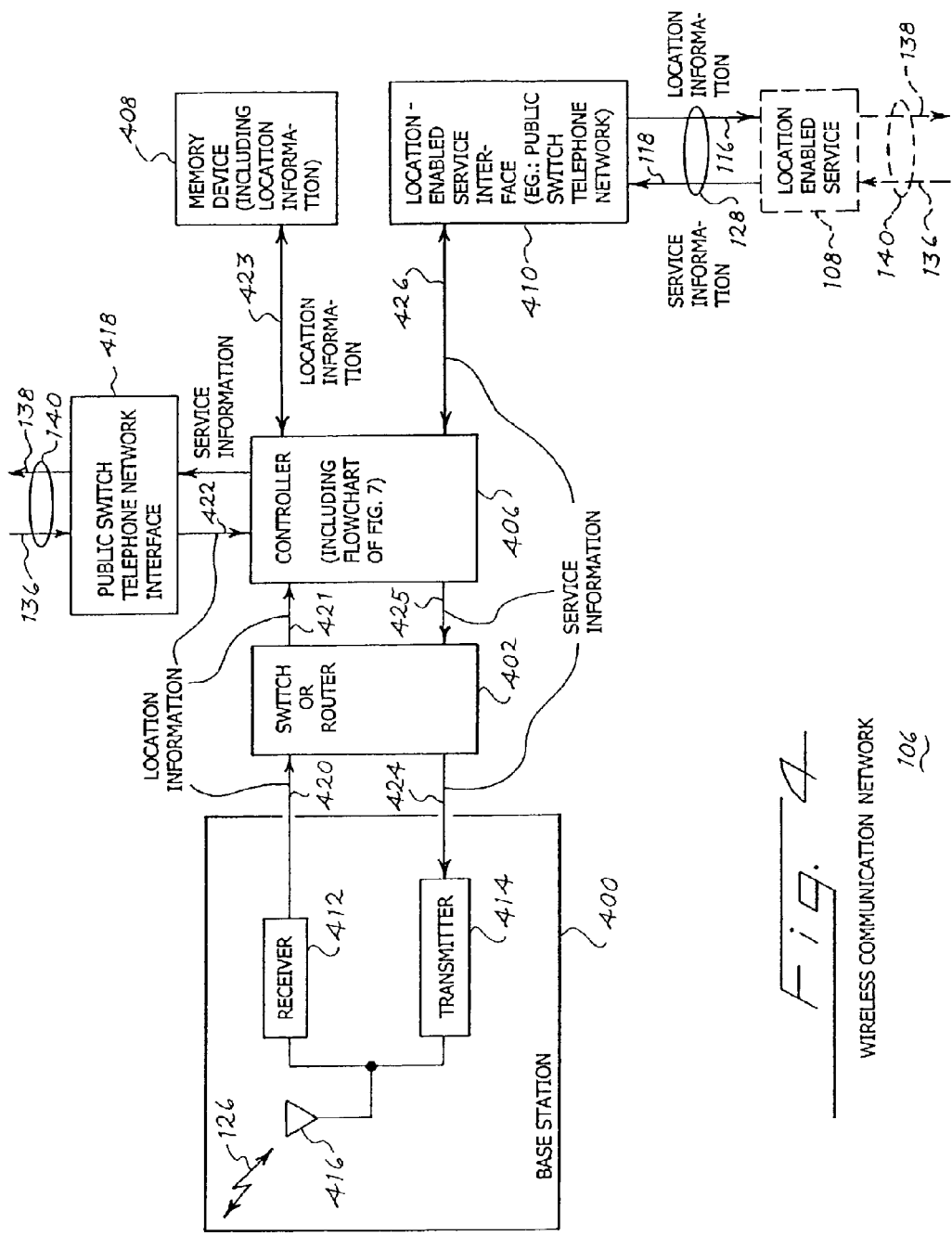

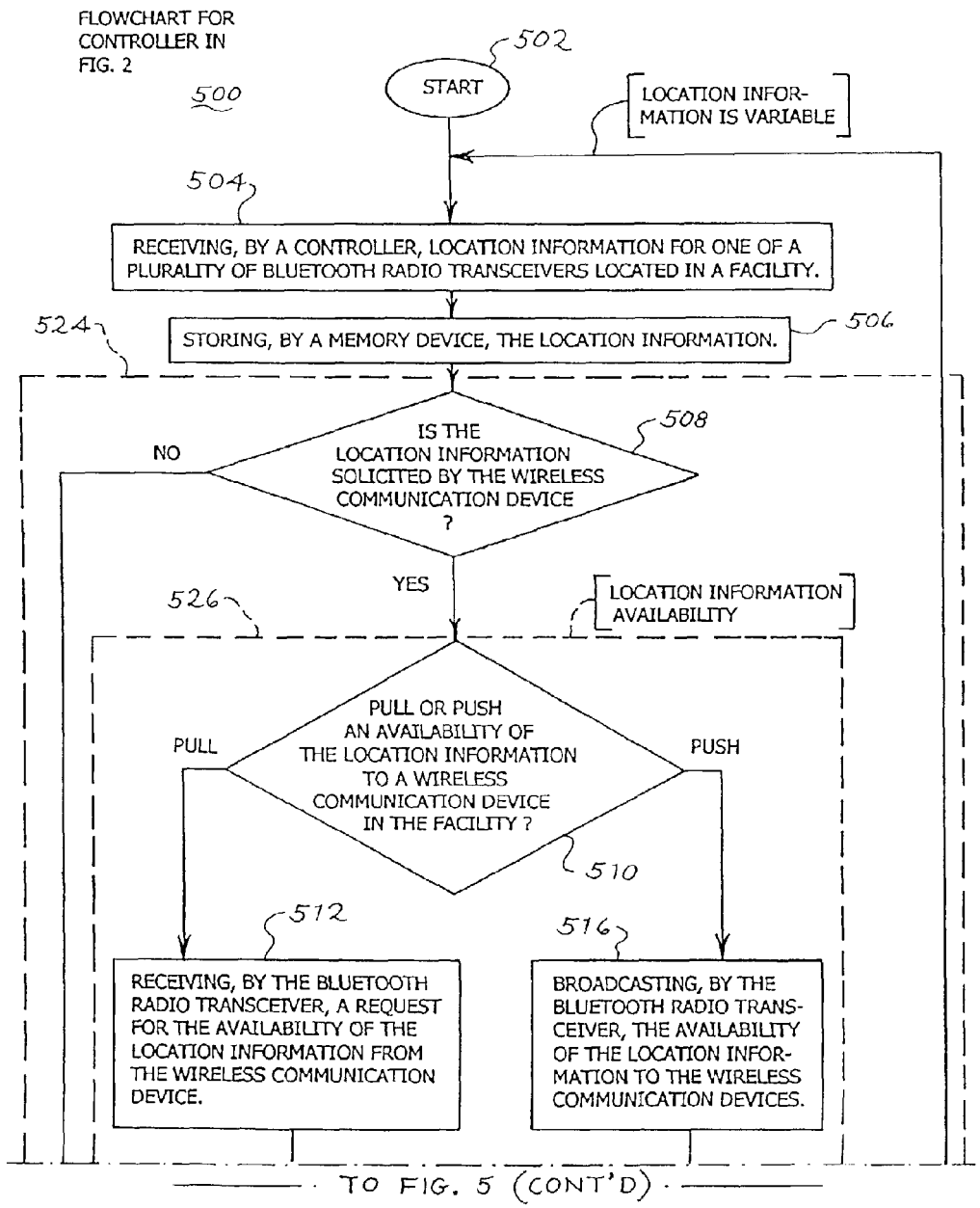

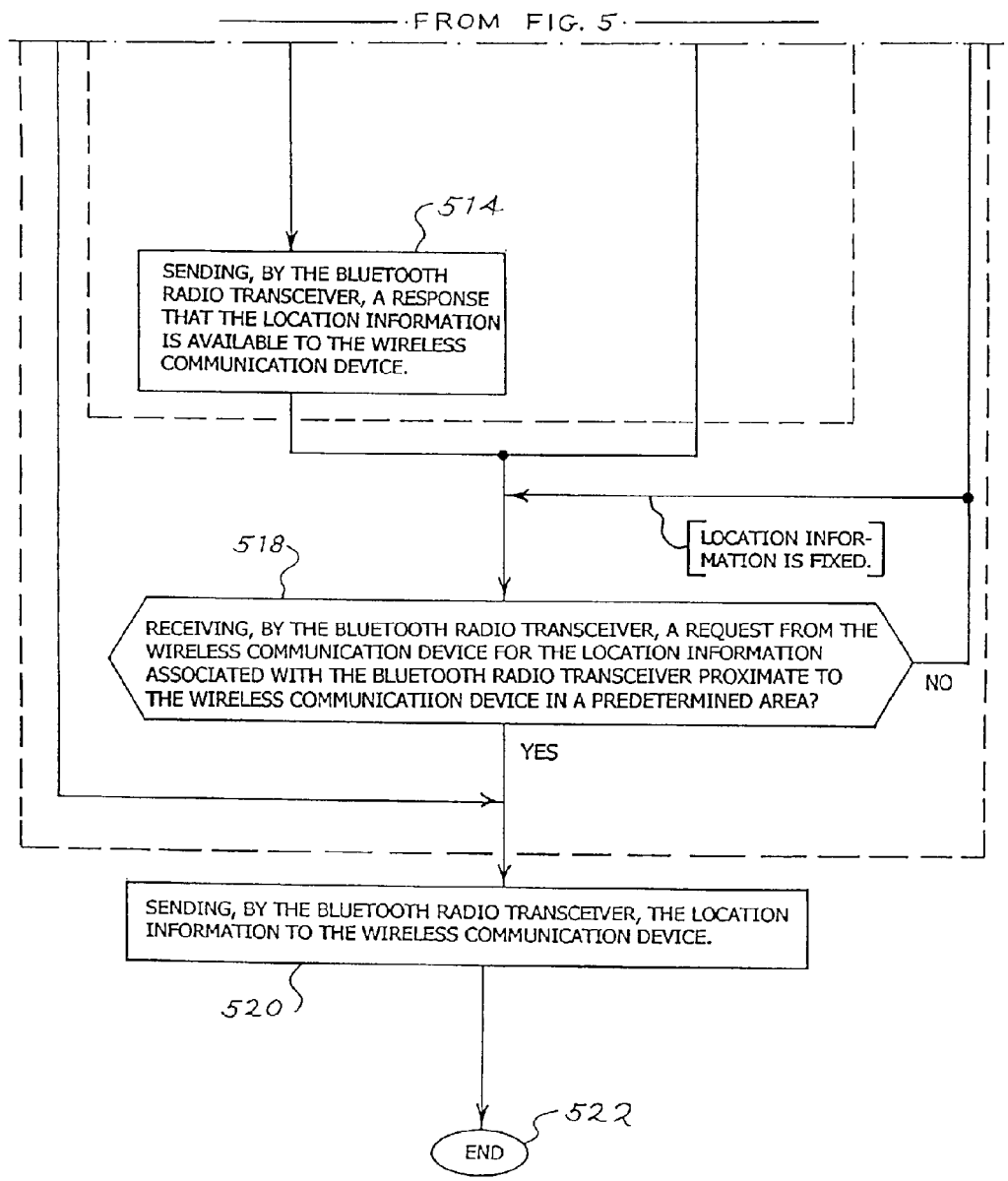

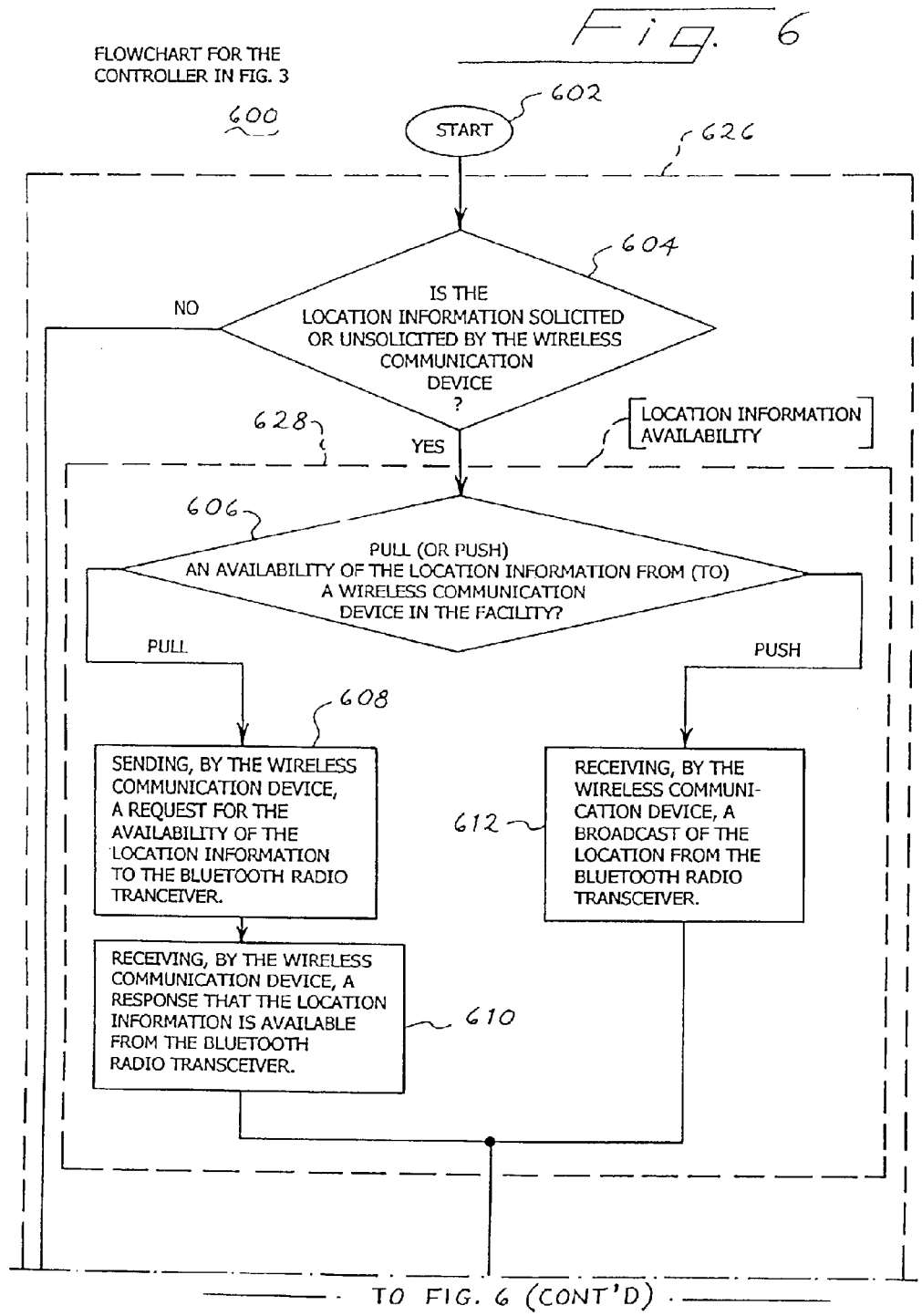

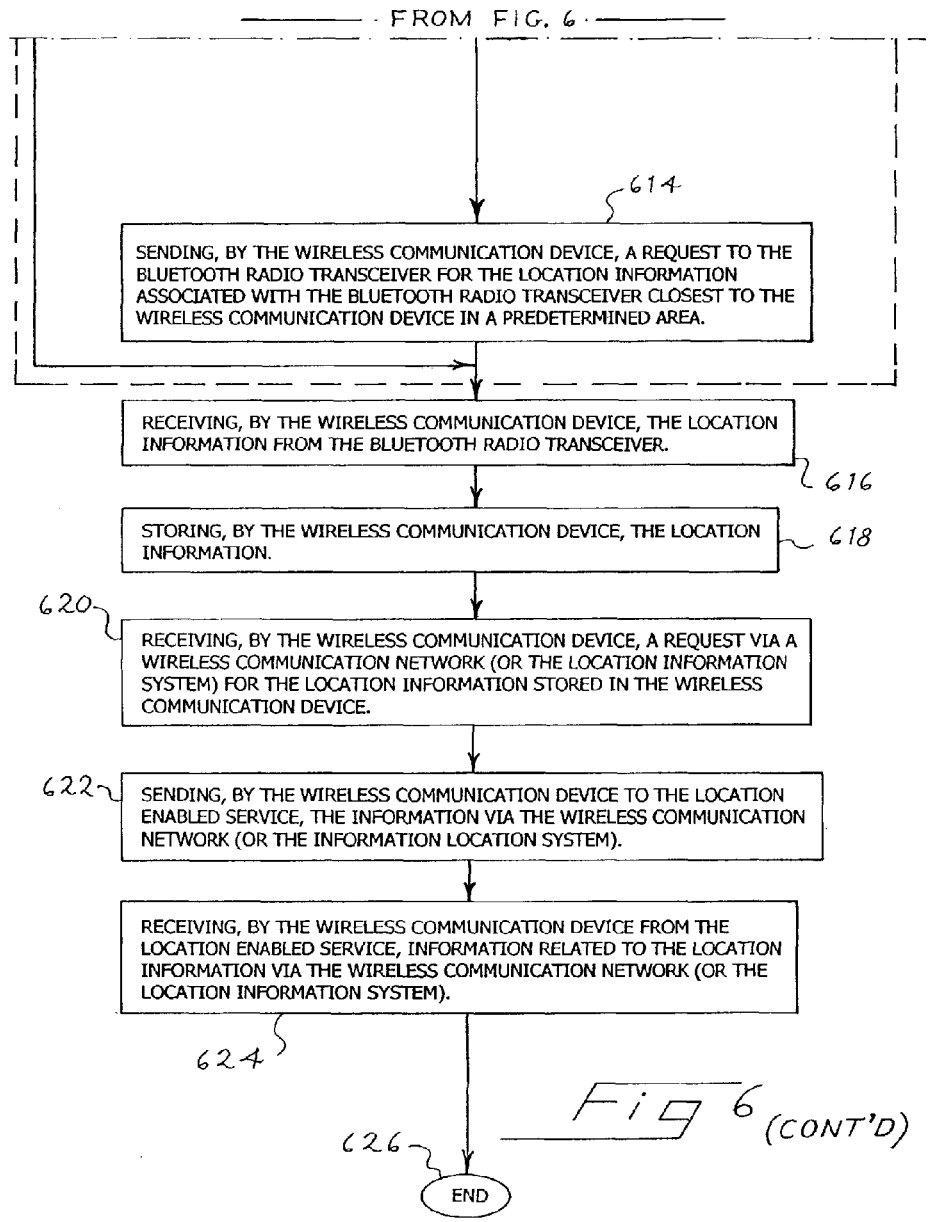

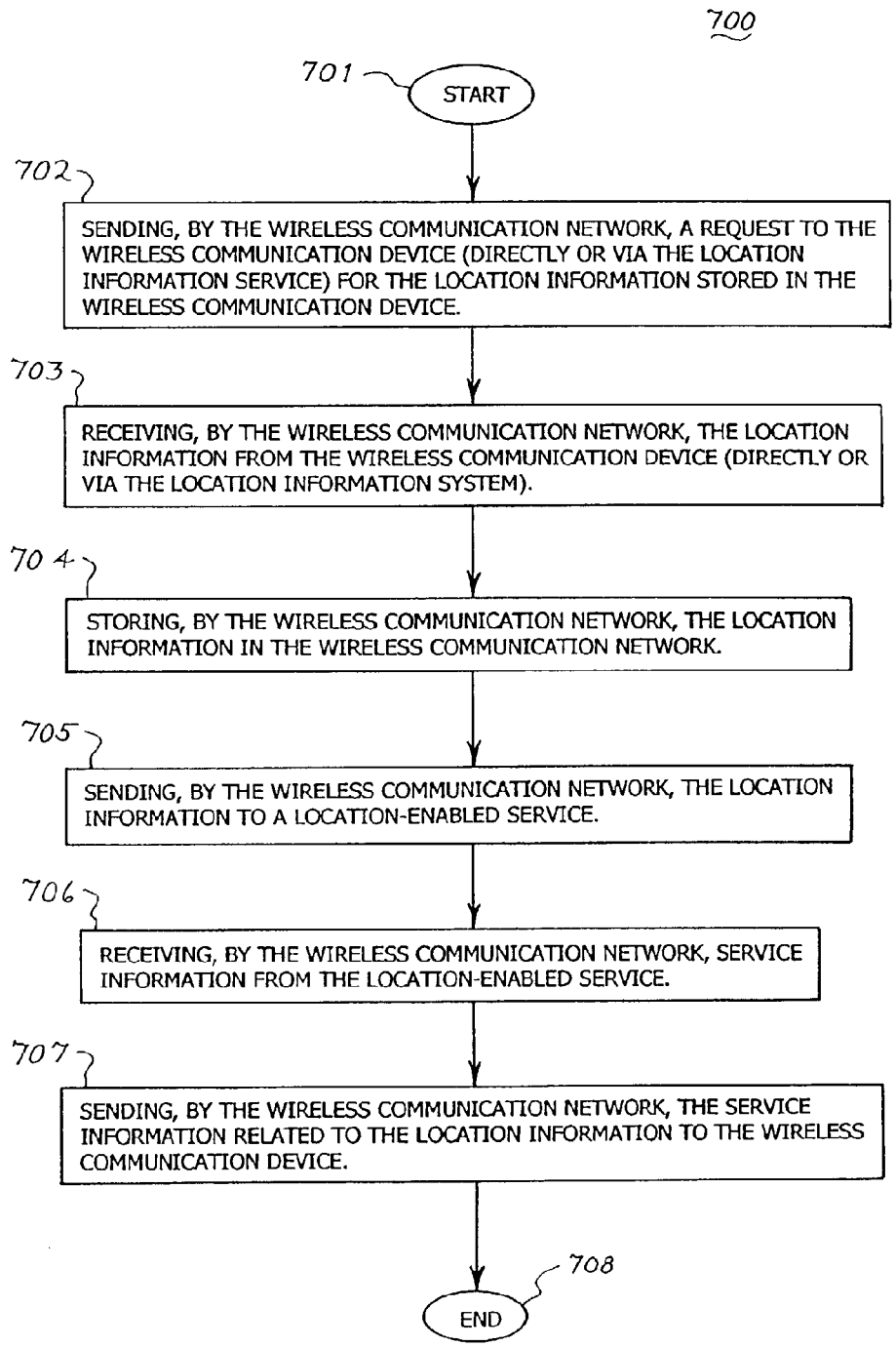

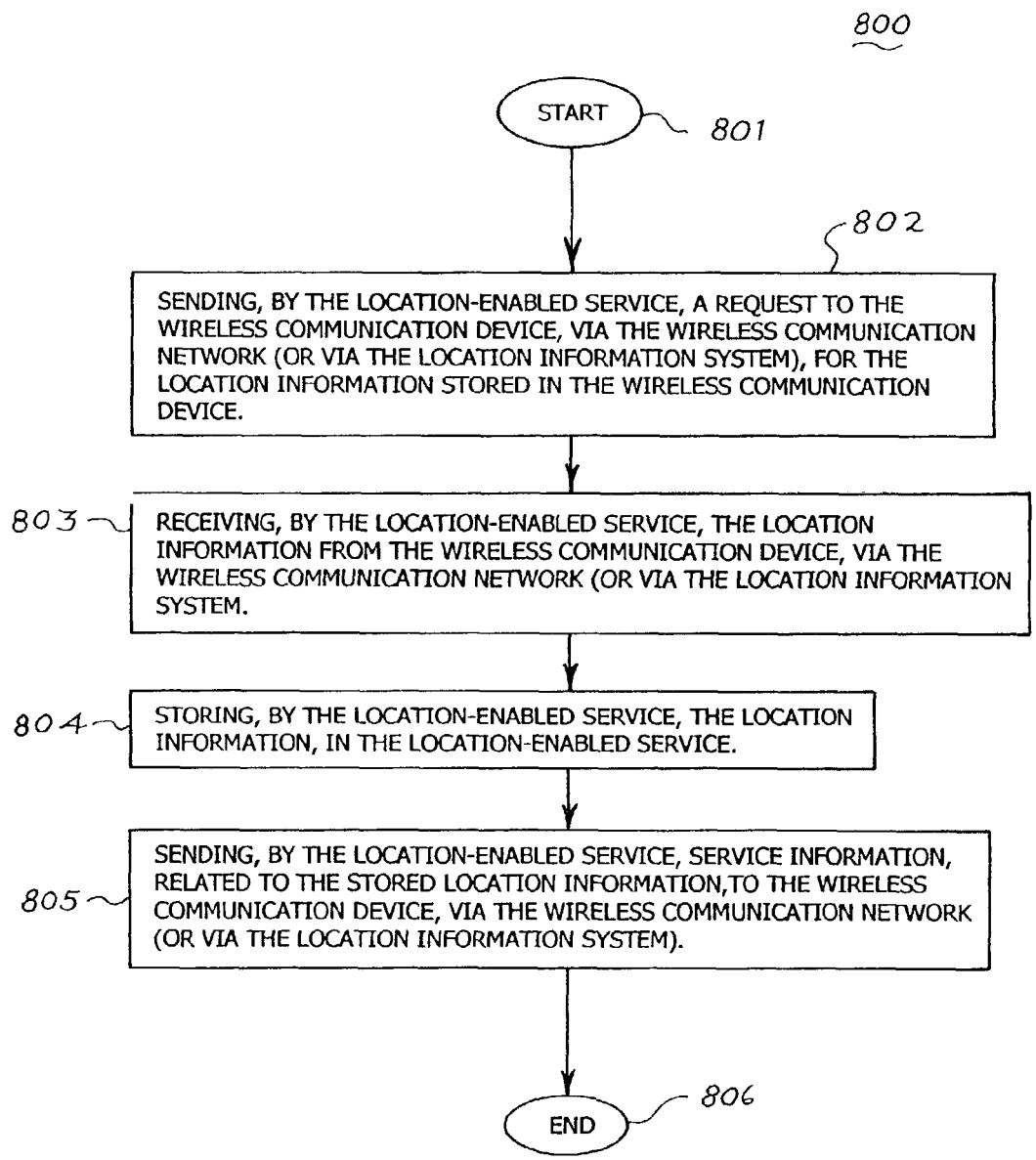

LOCATION INFORMATION SYSTEM FOR A WIRELESS COMMUNICATION DEVICE AND METHOD THEREFORE

RELATED APPLICATIONS

The present application is a continuation of U.S. patent application Ser. No. 10/454,363, filed Jun. 3, 2003, now U.S. Pat. No. 7,606,555, which is a continuation of U.S. patent application Ser. No. 09/497,954 (now U.S. Pat. No. 6,603,977), filed Feb. 4, 2000, the entirety of each of which are hereby incorporated by reference.

FILED OF THE INVENTION

The present invention relates generally to location information systems, and more particularly to a location information system for a wireless communication device and a method therefore.

BACKGROUND

I. Federal Communications Commission Authority Over 911 Service.

In the United States of America, the Federal Communications Commission (FCC) regulates wireless telecommunications companies that provide wireless telecommunications services. Wireless telecommunications is a group of telecommunications services under the heading of commercial mobile radio service (CMRS), as defined by the FCC. CMRS includes cellular, personal communications services (PCS), mobile satellite services (MSS) and enhanced specialized mobile radio (ESMR). Presently, CMRS does not include other forms of "wireless" communications such as paging and traditional dispatch. The FCC's authority over the wireless industry includes licensing, certain technical aspects of wireless service, timeframes in which service must be made available in given areas, and the provision of the 911 emergency answering service (i.e., 911 service), including basic 911 and enhanced 911 (i.e., E911).

The Department of Revenue of Washington State, USA provides an excellent summary of wireline and wireless 911 service in their document entitled: "Enhanced 911 Funding Study." This study is presently located at the Internet web site: http://dor.wa.gov/index asp?/pub/e911. The most relevant sections, including the executive summary, the introduction, chapter 1, chapter 2 text and drawings, and chapter 3 text and chart, have been printed out and provided with an information disclosure statement for the present patent application as a permanent reference to the present patent application. Chapter 1 describes the background of E911 wireless in Washington State. Chapter 2 describes E911 wireless technology with drawings. Chapter 3 describes the technical components of Phase I and II of E911 wireless with a chart. This entire study, including, but not limited to chapters 1, 2 and 3 along with the referenced drawings and charts, is herein incorporated into the present patent application by reference not only as a description for the background of the present invention, but also as a description for the detailed description of the present invention. Further, anything disclosed in this study, such as any term, concept, feature, service, drawing, chart, method, apparatus, system, etc. or portion thereof, may be used in combination with anything disclosed in the present patent application for support of any claims in the present or related patent applications. Highlights of this funding study are included in sections A through L, as follows.

A. General Description of the 911 Service.

To the public, 911 is an emergency telephone number that a caller dials for fire, medical, and/or police emergency assistance. Callers use both wireline and wireless phones to dial 911. Technically, 911 is an emergency answering service. When a caller dials the digits 9-1-1, a call travels over the public telephone network to a telecommunications company's switch. The switch recognizes the 911 digits and sends the call to a 911 emergency answering center, commonly known as a public safety answering point (PSAP).

B. Types of 911 Service.

There are two types of 911 service-basic (basic 911) and enhanced (E911). With the basic 911 service, all 911 calls go to the same PSAP in a particular area even if the caller does not live in the area served by the PSAP. When the call taker answers the call, only the voice of the caller is provided. Therefore, the call taker must request the address information from the caller, and then determine which police, fire, and emergency medical agencies need to respond to the caller's address. In addition, if the caller is unable to speak due to a medical circumstance such as a heart attack or choking, or does not know their phone number or location, the call taker may not be able to provide assistance to the caller.

With the E911 service, the telephone company switch routes the 911 call to the PSAP that serves the address of the location of the caller making the call. The telephone subscriber's name (personal or business), the location of the telephone used by a caller, the telephone number, and associated emergency response information is sent to a computer display at a call taker's answering position at the PSAP. The call taker has the information needed to send help to callers who are unable to speak or do not know their telephone number or location. The display of the telephone subscriber's phone number is known as Automatic Number Identification (ANI). The display of the telephone subscriber's location is known as Automatic Location Identification (ALI).

C. Current Wireline and Wireless 911 Service.

Wireline 911 calls travel via a wireline E911 system from the caller to the PSAP. Wireless 911 calls travel via the wireless network to the wireline E911 system and then to the PSAP. The major components of the E911 wireline system are: a Public Switched Telephone Network (PSTN), a wireless telecommunications network, a dedicated E911 system, a E911 selective router, a E911 database, and the PSAPs. The PSTN is a wireline network of equipment, lines and controls assembled to establish communications paths between calling and called parties in North America. The wireless telecommunications network includes the radio frequencies, cell sites, equipment and controls that are assembled to transport a wireless call from a wireless phone to the PSTN. The dedicated E911 system includes network, database, and the specialized E911 equipment at the PSAP that is required to display the E911 caller's phone number and location. The dedicated E911 system includes communication paths, known as telephone trunks, between wireline central office switches, or between a 911 control office and the PSAP that are used only for 911 calls. The E911 selective router is a piece of equipment located at the wireline telephone company's regional switch. The selective router sends the E911 call to the proper PSAP based on the telephone number of the calling party, the location of the caller, and a routing code called an emergency service number (ESN). The ESN is a number representing emergency services agencies, such as law enforcement, fire, and emergency medical service, that serve a specific range of addresses within a particular geographic area known as an emergency service zone (ESZ). The ESN facilitates selective routing to the appropriate PSAP and the dispatching of the proper service agency (ies). It controls delivery of the voice call with the ANI to the PSAP and provides selective routing, speed calling, selective transfer, fixed transfer and certain maintenance functions for each PSAP. The E911 database is a database which houses the ANI and ALI records of telephone subscribers. The information includes a database of street names and house number ranges, and the telephone customer's names, addresses, phone numbers and emergency response information. The 911 database is maintained by the telephone company. The PSAPs, also known as 911 call answering points, are facilities that are equipped and staffed to handle 911 calls twenty four hours a day, seven days a week. A primary PSAP receives the calls directly. A secondary PSAP only receives calls that have been transferred to them by the primary PSAP.

D. Operation of the Present Wireline Enhanced 911 Service.

When a caller dials 9-1-1 from a wireline phone, the call travels over the PSTN just like any other call to the telephone company's central office (CO). At the CO, the switching equipment recognizes the digits 9-1-1 and immediately transfers the call from the public switched network to dedicated 911 trunks that carry the call to the 911 selective router. At the 911 selective router, specialized software recognizes the 911 routing number associated with the caller's telephone number and routes the call along dedicated 911 trunks to the PSAP that serves the caller's geographic area. When the 911 call is received by the specialized 911 equipment at the PSAP, the caller's phone number is automatically sent via dedicated data circuits to the 911 database, which is maintained by the telephone company providing 911 service to the PSAP. The caller's name, address, telephone number, and associated emergency response information is retrieved from the 911 database. The caller's information is sent to the PSAP over the data circuits to a display at the call taker answering position. The call taker has the information needed to send help to people who are unable to speak or do not know their telephone number or location.

E. Operation of the Present Wireless 911 Service.

When a caller dials 911 from a wireless phone, the call travels via radio frequency (RF) to a base station, then to a switch and then to the PSTN telephone lines. The RF coverage area of the base station is known as a cell site. A cell site typically has one to three cell sectors. Each cell sector is an area geographically defined for RF coverage by the wireless company and served by one face of a cell antenna. Each cell site routes 911 calls to a predetermined PSAP that provides 911 service for the majority of the cell site. From this point, there are a variety of methods being used to transport the 911 calls to PSAPs including: forward the 911 call to a seven-digit number, forward the 911 call to a seven-digit 911 trunk number, seven-digit ANI and ten-digit ANI, as are well known in the telecommunications field.

F. E911 Service for Wireless Telecommunications.

The FCC issued an order in 1996 (docket number 94-102) that requires wireless carriers to provide E911 service to their subscribers. This means that wireless callers will have similar levels of ANI and ALI service for 911 calls as wireline callers currently have.

The wireless carriers are to implement wireless E911 in two phases (Phase I and II). In Phase I, they are required to provide the 911 caller's phone number and cell sector location by April 1998 or six months after the service is ordered. In Phase II, the wireless carriers have to provide the caller's latitude and longitude within a radius of 125 meters (410 feet) at least 67 percent of the time by Oct. 1, 2001 or six months after the service is ordered This means that the actual location of the caller has to be determined, the data has to be sent through the 911 system to the PSAP, and the latitude and longitude data have to be converted into a usable location so the 911 call can be dispatched. If the caller is moving, it may be desirable that the location be updated to track the caller, although this is not a requirement of the FCC order. If the caller is out of their home area, the wireless systems have to be interoperable to offer 911 service.

G. Technical Challenges of Implementing E911 Service for Phase II.

Locating the wireless caller. Wireless callers are usually mobile and technology has to locate callers in terms of latitude and longitude.

Generating accurate data to describe the location. Data for latitude, longitude, altitude, speed, and direction are necessary to physically locate a moving caller. Data calculations may be skewed by physical terrain, weather, user operation (eg. indoor, in-vehicle, mobile or stationary). The time to transmit the data is affected by the call volume, geography, and user operation.

Moving the location data through the 911 network. The new data requires up to 40 digits. The current selective router and 911 network can only handle 8 digits.

Transmitting more data per caller through the system if the caller is moving. The data changes as the person moves. Data may need to be transmitted more frequently to effectively track a moving caller. This could result in conversations being interrupted if location updates use in-band signaling. In-band signaling means that the data and the voice travel on the same path to complete the call.

Translating digital data to a usable location. In order for call takers to communicate the actual location of a caller to dispatchers, existing maps will have to be corrected to reflect latitude and longitude and will need frequent updates to maintain accuracy. These maps will have to be electronically available at each call taker position at the PSAPs.

Interfacing with different frequency technologies and multiple infrastructure and network configurations. There are different technologies, frequencies, and network configurations among the wireless carriers. All of these systems have to interface with the E911 network.

H. Technical Solutions For Implementing E911 Service For Phase II.

Private research and development companies are currently developing and testing cellular network-based solutions and handset-based solutions for Phase II. With the cellular network solutions, location technology is added to the current cell sites to calculate a caller's latitude and longitude. The technology works as long as the caller's phone can access at least two cell sites. TruePosition has operated field trials for a cellular network solution along a 350 square mile area on Interstate 95 in New Jersey and in metropolitan Houston, Tex.

With the handset-based solutions, a Global Positioning System (GPS) receiver in the handset receives latitude and longitude data from twenty four GPS satellites orbiting the earth by and sends the data to the PSAP. This handset-based solution works as long as the GPS receiver can receive the satellite signal. Some handset-based solutions using the GPS receiver process the received location data in the handset and send the processed data through to the PSAP. Other handset-based solutions using the GPS receiver receive the location data in the handset and send the location data to a central location for processing. The processed location data is then sent to the PSAP. Integrated Data Communications (IDC) of Seattle, Wash. has technology that allows GPS location data to be processed by a GPS receiver in the wireless handset and then sent to the PSAP.

Operation of Cellular Network-Based Solutions.

Cellular network-based solutions add location technology to the cell sites and calculate the location information using triangulation methods. When the caller dials 911, the signal is received up by two or more cell sites. Computer software analyzes data from the cell sites using a particular method or a hybrid of the following methods-time difference of arrival (TDOA) and angle of arrival (AOA). Examples of a cellular network-based solutions are disclosed in U.S. Pat. No. 5,890,068 (assigned to Cell-Loc, Inc.) and U.S. Pat. No. 5,963,866 (assigned to Lucent Technologies).

TDOA uses data from three or more cell sites and the time of arrival to compute where the caller is located. The TDOA system is an overlay system that fits on the existing network so there is little impact to the wireless network. Because the system relies exclusively on the radio signals that are broadcast from the telephone handset to locate a caller, the location quality of the system generally follows the voice quality of the underlying cellular network. As a wireless carrier expands and improves coverage in their network, the location system quality similarly expands. For a TDOA system, the location accuracy for indoor coverage deteriorates as the quality of the wireless call deteriorates. If the indoor cellular phone has good voice reception and transmission quality, then the location accuracy is relatively unaffected. Automatic location identification for TDOA includes latitude and longitude but not altitude.

The advantages to this method are that it can be applied to different wireless technologies and no modification to the handset is required. Once the system is installed all wireless subscribers would have automatic location identification within 410 feet 67 percent of the time as long as their wireless phone signal could access a cell site.

The challenges with TDOA are that it is dependent on the cell site configuration such as exact cell location, antenna height, and radio channel allocations. Therefore cooperation with existing wireless carriers is needed. It is also dependent on the number of TDOA receiver sites. The quality of accuracy of a TDOA system is proportional to the coverage area of TDOA receiver sites. An urban core typically requires one TDOA receiver site for every three or four cell sites. A rural area, with much larger cell coverage patterns, would typically require one TDOA receiver per cell site. The performance is affected when the radio signal bounces off objects along the path from the radio transmitter such as hills and buildings resulting in one strong signal and several identical weaker signals being received at different times. This phenomenon is known as multipath effect. The quality of the indoor coverage varies with the strength of the signal. TDOA requires accurate network time synchronization and an extensive cell site overlay.

AOA uses data from two or more cell sites and the angle of arrival to compute where a caller is located. The advantages to this method are that it applies to all mobile phones of any make, model, and vintage with no modifications to the handset required. The AOA system is an overlay system that fits on the existing network so there is little impact to the wireless network. Because the system relies exclusively on the radio signals that are broadcast from the phone to locate a caller, the location quality of the system generally follows the voice quality of the underlying cellular network. Similar to TDOA, the AOA system requires a series of angular receiver sites to be deployed in the network. There are fewer AOA receiver sites needed in an urban core per cell than in a rural area. An asset of AOA is its resistance to multipath effects which includes good indoor coverage. The challenges with this system are that it is typically dependent on additional antenna structures at the cell site. Therefore cooperation with the existing wireless operators is needed for access to most structures. The accuracy of an AOA system is inversely proportional to the distance of the phone from the AOA sites (the further the phone is away, the less accurate the system). Also, in rural configurations, cell sites tend to be adjacent to highways. This is a poor configuration for AOA since no location can be detected along the line-of-sight between two AOA receivers.

J. Operation of Handset-Based Solutions.

Currently there are two handset solutions being tested. Both use Global Positioning Satellite (GPS) technology to obtain location information. Examples of the handset-based solutions are disclosed in U.S. Pat. No. 5,479,482 (assigned to AT&T, Corp.) and U.S. Pat. No. 5,388,147 (assigned to AT&T, Corp.). The advantage of a GPS solution is its inherent high accuracy (as close as 40 feet). Some of the challenges with this technology will be its use in skyscrapers, forming what is known as "urban canyons" or an electromagnetic shielding effect, where it is difficult for the handset to receive the GPS data. The Washington State funding study suggests that tall buildings can be retrofitted to receive GPS information. Antennae could be placed on the roof and at each floor of the building to send the signal to a GPS receiver inside the building. However, this suggestion does not disclose how a cellular telephone would receive GPS information from the GPS antenna and receiver, since the GPS antenna and GPS receiver are disclosed to be attached or in the building and not attached to, disposed in or communicating with the cellular telephone. Further, with this suggestion it appears that GPS receiver would only receive the locations of the GPS antennas because that is where the GPS data is collected from the GPS satellites. Moreover, in an urban canyon environment, it is possible that only the GPS antenna located on the top of the building will be able to receive the GPS signals because it is able to receive the GPS signals from the GPS satellites. The other GPS antenna located on each floor may also be shielded from the GPS signals from the GPS satellites by the building's own structure if the GPS antennas are located inside the building or by other nearby tall skyscrapers if the GPS antennas are located outside of the building at each floor. Regardless of the handset-based solution, the handset solution needs to be accepted as a national solution or handsets of subscribers from different areas will not be compatible. There is also the issue of what to do about the handsets that are currently in use. One solution is to offer an after market battery pack adapter that allows the addition of the GPS receiver to the battery pack. Since there is a fairly fast turnover in handsets it would not be too long before a large number of users would have the GPS technology built into the handset.

K. Operation of a Cellular Network-Assisted GPS Handset Solution.

The cellular network-assisted GPS uses a GPS receiver in the handset to collect raw data from the GPS satellites. The raw data is then sent to equipment located at cell sites and then forwarded to network equipment for further processing. This network equipment computes and sends the latitude, longitude, and other location information to other network equipment for transmission to the PSAP. The advantage of the cellular-assisted GPS is that it reduces the processing of satellite data in the handset by using high-speed network-based computing. An additional advantage is that error correction and the time to get an initial reading are improved by the ability of the network to send information to the handset.

L. Operation of Autonomous GPS Handset Solution.

The autonomous GPS handset uses a complete GPS receiver and processor located in the handset. This standalone device does not need any network connections to obtain location information. The on-board processor can send location information through the cellular network overhead data channels or over the voice path via in-band technology. The advantage of sending the data via the voice path is that location information can be sent over any cellular or wireline network directly to the PSAP without changing any of the existing network.

M. Operation of a Cellular Network-Based and Handset-Based Solution.

The cellular network-based solution, as described hereinabove in section I, and handset-based solution, as described hereinabove in Sections J, K and L, may also be combined to provide a more accurate determination of the location of the cellular handset. An example of such a combination solution is disclosed in U.S. Pat. No. 5,724,660 (assigned to AT&T Wireless Services, Inc.).

II. Bluetooth

Bluetooth, presently having a web site at http://www.bluetooth.com, is a codename for an open technology standard specification jointly developed by Ericsson, Intel, IBM, Toshiba, and Nokia. Bluetooth is for small form factor, low-cost, short range radio links of voice and data communications between mobile devices, such as between a cellular phone and a laptop computer, and between mobile and fixed devices, such as between an electronic camera and a printer. The short range radio links are implemented using compact and cost effective short range radio transceivers operating in the international 2.4 GHz ISM band. Hence, Bluetooth replaces cables and makes automatic, unattended, short range communications between devices possible. However, Bluetooth does not appear to disclose or suggest an application for 911 service, including E911 service for wireless communication devices, such as cellular telephones.

Accordingly, there is a need for a location information system to provide location information, such as the ALI for the E911 service, for a wireless communication device, such as a cellular telephone, and a method therefore to permit the wireless communication device to engage the E911 service in places where the cellular network-based solutions, cellular handset-based solutions, or a combination of the cellular network-based solutions and the cellular handset-based do not adequately perform.

BRIEF DESCRIPTION OF THE DRAWINGS

FIG. 4 illustrates a block diagram of the wireless communication network illustrated in FIG. 1 in accordance with a preferred embodiment of the present invention.

FIG. 5 illustrates a flowchart describing a method performed by the location information system illustrates in FIG. 2 in accordance with a preferred embodiment of the present invention.

FIG. 6 illustrates a flowchart describing a method performed by the wireless communication device illustrated in FIG. 3 in accordance with a preferred embodiment of the present invention.

FIG. 7 illustrates a flowchart describing a method performed by the wireless communication network illustrated in FIG. 4 in accordance with a preferred embodiment of the present invention.

FIG. 8 illustrates a flowchart describing a method performed by the location-enabled service illustrated in FIG. 1 in accordance with a preferred embodiment of the present invention.

DETAILED DESCRIPTION OF THE DRAWINGS

Figure 1:
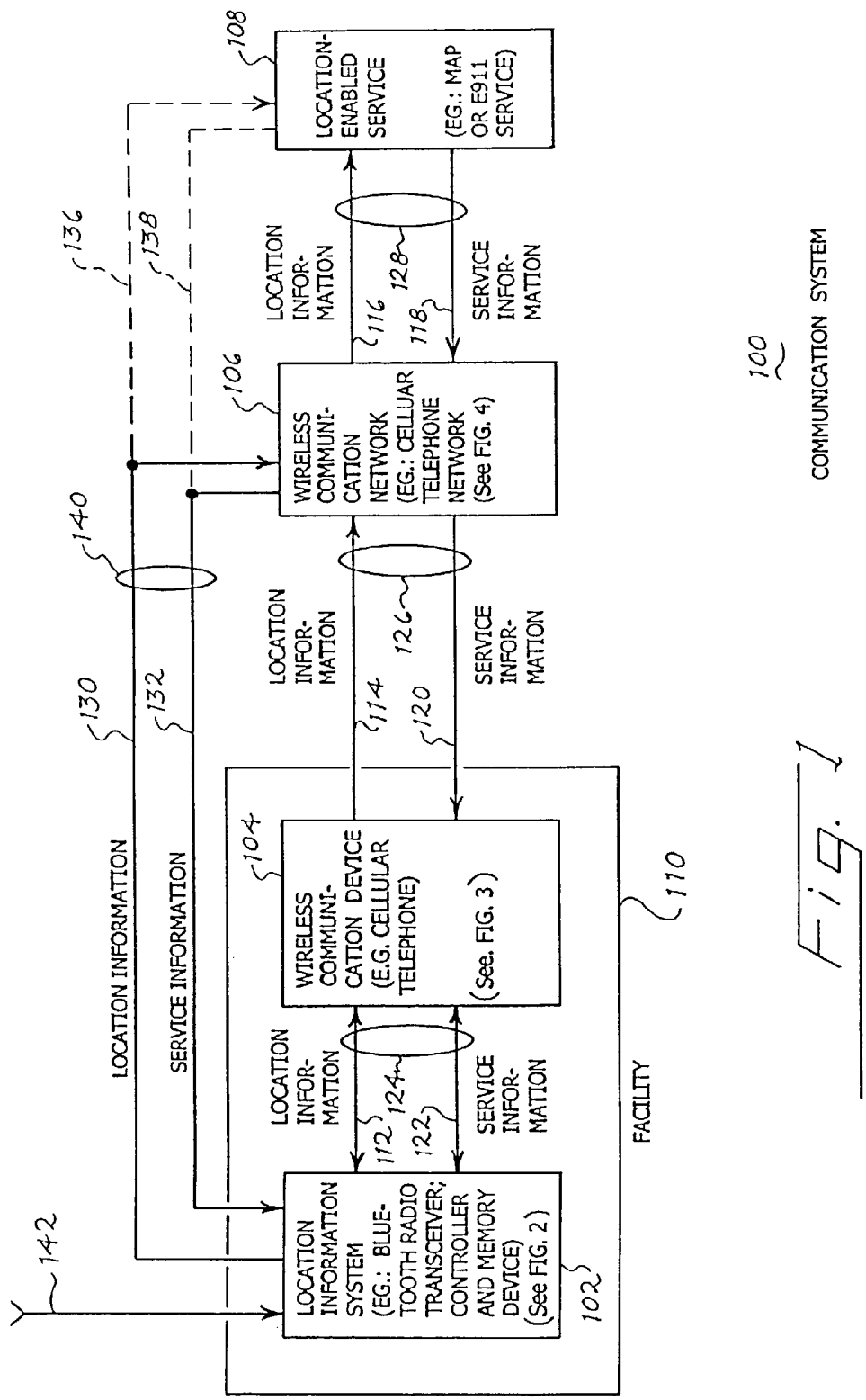
FIG. 1 illustrates a block diagram of a communication system, including a location information system, a wireless communication device, a wireless communication network, and a location-enabled service in accordance with a preferred embodiment of the present invention.

Generally, to meet the forgoing need, a location information system 102 receives location information representing a plurality of location descriptions respectively associated with a plurality of predetermined areas 210-213 in a facility 110. Then, the location information system 102 sends the location information to a wireless communication device 104 present in one of the predetermined areas in the facility over a short-range wireless communication channel 124. Therefore, the wireless communication device 104 is told its location in a facility for use as an ALI during an E911 call by the wireless communication device 104, where conventional network-based solutions, device-based solutions, or a combination of the network-based solutions and the device-based solution do not adequately perform, such as in the facility 110.

More particularly, the location information system 102 includes a controller 200, a location entry device 202, a memory device 204 and wireless communication units 206-209. The controller 200 receives location information from the location entry device 202, such as a keyboard or a global positioning satellite receiver, for storage in the memory device 204. The location information represents locations of predetermined areas 210-213, such as floors, rooms, hallways, stairways and elevators, associated with each of the wireless communication units 206-209 in a facility 110. A wireless communication unit 209 sends the location information to a wireless communication device 104, such as a cellular telephone device, over a short-range wireless communication channel 124, such as a radio frequency communication channel. Preferably, each of the wireless communication units 206-209 and the wireless communication device 104 include a short-range radio frequency transceiver designed to communicate over the short-range wireless communication channel 124 according to a Bluetooth technology specification. Preferably, the location information is used for E911 automatic location identification in the facility 110. The location information may be solicited or unsolicited from the location information system by the wireless communication device 104. When the location information is solicited, the location information is either pulled by the wireless communication device 104 or pushed by the location information system using a location information service. The present detailed description of the preferred embodiment discloses further features and advantages with reference to the figures.

FIG. 1 illustrates a block diagram of a communication system 100, including a location information system 102, a wireless communication device 104, a wireless communication network 106, and a location-enabled service 108 in accordance with a preferred embodiment of the present invention.

Location information is communicated between the blocks of FIG. 1 on paths 112, 114, 116, and 130. Service information is communicated between the blocks of FIG. 1 on paths 118, 120, 122 and 138. Pairs of paths 124, 126, 128 and 140 between the blocks of FIG. 1 represent communication channels between the blocks.

In operation, the location information system 102 communicates with the wireless communication device 104 over the communication channel 124. The wireless communication device 104 communicates with the wireless communication network 106 over the communication channel 126. The wireless communication network 106 communicates with the location-enabled service 108 over the communication channel 128. The location information system 102 also communicates with the wireless communication network 106 over the communication channel 140. Alternatively, location information system 102 communicates with the location-enabled service 108 over the communication channel 140.

The location information system 102 is preferably a wireless communication system designed to operate according to the Bluetooth technology specification, herein incorporated into the present application by reference and described hereinabove. An advantage of using wireless communication system, designed to operate according to the Bluetooth technology specification, is that the short-range radio transceivers (example, about 10 meters) transmit location information to the wireless communication device 104 for use with the E911 service and other location-based services. Further advantages and features of using Bluetooth technology specification is described hereinbelow. Alternatively, the location information system 102 may include, without limitation, wireless public branch exchange (PBX) communication system, cordless telephone communication system, small-cell or pico-cell communication system, and an in-building communication system.

The wireless communication device 104 is preferably a cellular telephone device. Alternatively, the wireless communication device 104 includes, without limitation, cordless telephones, personal digital assistants, pagers, personal notebooks, portable computers and two-way radios.

The wireless communication network 106 is preferably a cellular telephone network providing coverage over a relatively wide area, such as a city. Alternatively, the wireless communication network 106 includes, without limitation, wireless public branch exchange (PBX) communication networks, cordless telephone communication networks, small-cell or pico-cell communication networks, global satellite communication networks, paging communication networks and two-way radio networks.

The location-enabled service 108 represents a third party person or service that communicates with the wireless communication device 104, via the wireless communication network 106 and/or via the location information system 102. The location-enabled service 108 preferably provides location-based services or applications to the wireless communication device 104. Such location-based services include, without limitation, a map service, a people finder service, a place finder service, to name a few. The location-enabled service 108 is preferably operated by a third party, but may also be integrated with the wireless communication network 106 and/or the location information system 102.

The communication channel 124 between the location information system 102 and the wireless communication device 104 is preferably a radio frequency communication channel operating at 2.4 GHz according to the Bluetooth technology standard. Alternatively, the communication channel 124 may operate at any other radio frequency in accordance with the design of the location information system 102 and the wireless communication device 104. Alternatively, the communication channel 124 may include, without limitation, an infrared communication channel.

The communication channel 126 between the wireless communication device 104 and the wireless communication network 106 is preferably a radio frequency communication channel operating at cellular frequencies. Alternatively, the communication channel 126 operate at any other radio frequency in accordance with the design of the wireless communication device 104 and the wireless communication network 106. Alternatively, the communication channel 126 may include, without limitation, an infrared communication channel.

The communication channel 128 between the wireless communication network 104 and the location-enabled service 108 is preferably a wireline communication channel carried by a public switch telephone network (PSTN). Alternatively, the communication channel 128 may be a radio frequency communication channel or an infrared communication channel.

The communication channel 140 between the location information system 102 at least one of the wireless communication network 106 and the location-enabled service 108 is preferably a wireline communication channel carried by a public switch telephone network (PSTN). Alternatively, the communication channel 140 may be a radio frequency communication channel or an infrared communication channel.

Figure 2:
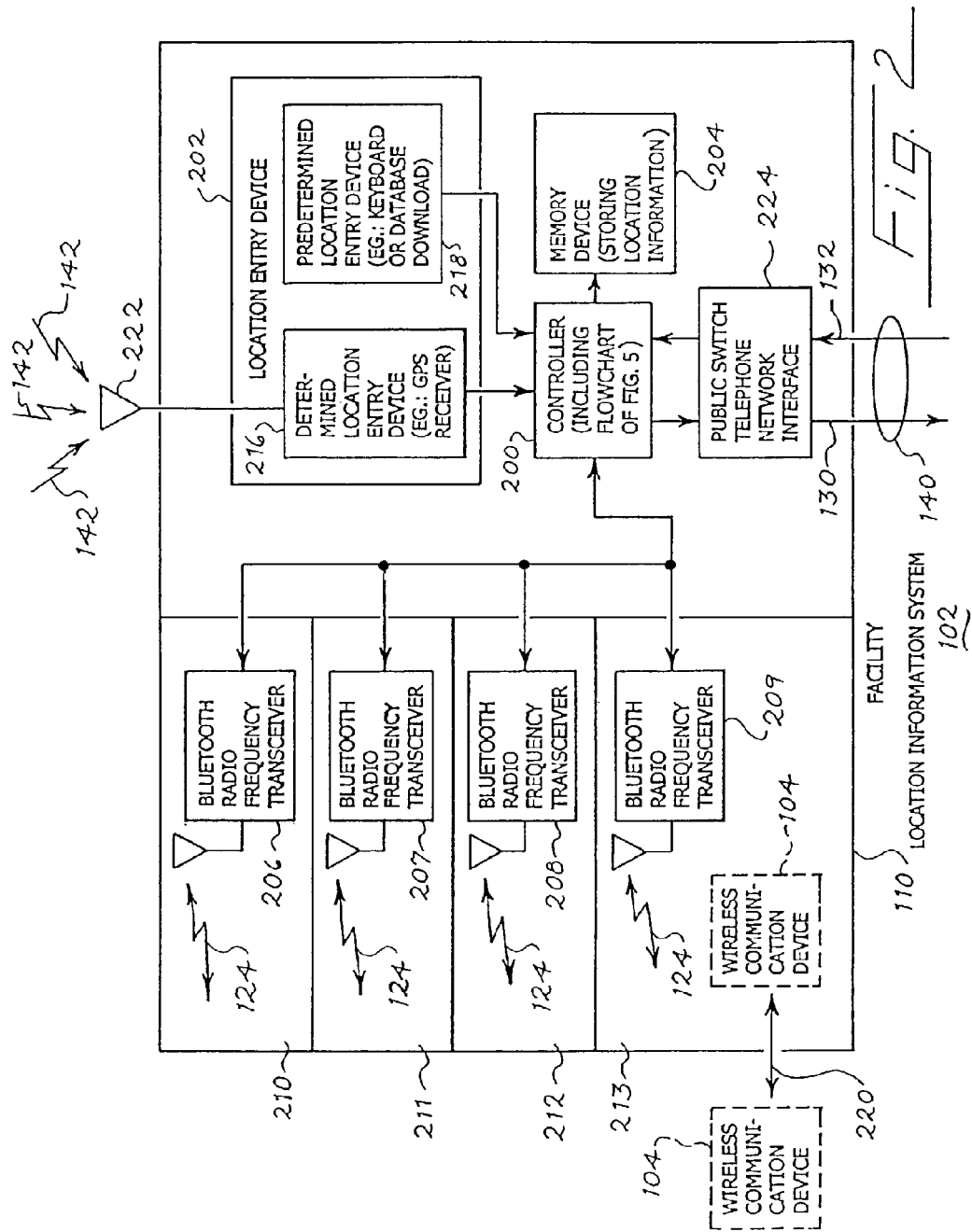
FIG. 2 illustrates a block diagram of the location information system illustrated in FIG. 1 in accordance with a preferred embodiment of the present invention.

FIG. 2 illustrates a block diagram of the location information system 102 illustrated in FIG. 1 in accordance with a preferred embodiment of the present invention. The location information system 102 generally includes a controller 200, a plurality of wireless communication units 206-209, a memory device 204 and a location entry device 202. The location entry device 202 further generally includes a determined location entry device 216 and a predetermined location entry device 218.

The controller 200 receives location information representing a plurality of location descriptions respectively associated with a plurality of predetermined areas 210-213 in the facility 110. Each of the wireless communication units 206-209 is coupled to the controller 200. At least one of the wireless communication units, for example unit 209, sends the location information to the wireless communication device 104 present in one of the plurality of predetermined areas, for example area 213, in the facility 110 over a short-range wireless communication channel, such as a Bluetooth channel, responsive to the controller 200 receiving the location information.

The plurality of predetermined areas identify at least one of latitude, longitude, altitude, a street address, a floor, a room, a hallway, a stairwell, an elevator, an isle, a seat, and the like, in the facility 110. The location information represents a plurality of location descriptions respectively associated with the plurality of predetermined areas.

The facility includes, for example and without limitation, a building, a skyscraper, a conference center, a hotel, a sports center, such as a stadium or a field, and entertainment center, such as a movie theater or a concert hall, a fixed structure, such as a building, a moveable structure, such as a car, bus or boat, an closed or contained structure, such as a building, and an open structure, such as an outside field staging an exhibition. The location information system 102 is advantageous in facilities where the wireless communication device cannot receive location information when the wireless communication device 104 is located inside the facility making it difficult for the wireless communication device 104 to transmit the location information to an emergency service. Alternatively, the location information system 102 is also advantageous in facilities when the facility has many areas, such as many rooms, or when the facility has many people, such as a sports stadium or concert hall, thereby making it difficult for rescue personnel to find a person in the building, even if the wireless communication device 104 can transmit the location information to the emergency service.

The location information system 102 is preferably located and operating in a facility 110. The wireless communication device 104 is preferably in the facility 110 when communicating with the location information system 102. However, the wireless communication device 104 is free to move in and out of the facility and is not restricted to being in the facility as shown by reference number 220.

The memory device 204, coupled to the controller 200, stores the location information responsive receiving the location information from the controller.

The location entry device 202, coupled to the controller 200, provides the location information to the controller 200. Preferably, the location entry device 202 provides predetermined location information to the controller 200, such as, for example, manually by a keyboard or voice recognition program, or semi-automatically by a download from a database previously created. Alternatively, the location entry device 202 provides determined location information to the controller 200, such as, for example by a global positioning satellite (GPS) receiver, coupled to a GPS antenna 222 positioned proximate to the facility to receive GPS signals from global positioning satellites orbiting the earth. The GPS receiver determines the location information responsive to receiving the GPS signals from the GPS antenna 222 and then sends the determined location information to the controller 200. The GPS solution is particularly advantageous for moving facilities, such as a bus, car, or boat, wherein the location information can be updated in real time.

Preferably, in an E911 application, the wireless communication unit 209 sends the location information at least one of before, during and after the wireless communication device 104 communicates an emergency telephone call to a public safety answering point. The location information sent to the wireless communication device 104 is used for an automatic location identification (ALI) of the wireless communication device 104 in the facility 110 by the public safety answering point. Alternatively, the wireless communication device 104 may utilize the location information for any other location-based service or application such as a people finder or a place finder.

Preferably, each of the wireless communication units 206-209 and the wireless communication device 104 further comprise a radio frequency transceiver designed to operate in accordance with the Bluetooth technology specification. Preferably, the short-range wireless communication channel 124 is a radio frequency communication channel designed to operate in accordance with the Bluetooth technology specification.

Particularly, note the PSTN interface 224 coupled to the controller 200 of the location information system 102 and the communication channel 140 coupled between the controller 200 and at least one of the wireless communication network 106 and the location-enabled service 108. The PSTN interface 224 and the communication channel 140 generally represent a communication interface to a system outside of the location information system 102. A combination of the PSTN interface 224, the communication channel 140 and the location information system 102 advantageously provide the wireless communication device 104 with an alternate communication path for communicating with at least one of the wireless communication network 106 and the location-enabled service 108. The types of communication on the alternate communication path include voice, data or video signals typically associated with narrow or high bandwidth telephone communications. Without this combination, the wireless communication device 104 typically communicates with the wireless communication network 106 over the communication channel 126. The alternate communication path 140 advantageously permits the wireless communication device 104 to make a telephone call, for example, when the communication channel 126 is not available. For example, the communication channel 126 may not be available when the wireless communication device 104 is urban canyon situations, such as in a skyscraper or in the basement of a building where conventional cellular communications do not perform adequately. In this case, although the location information system 102 provides the wireless communication device 104 with appropriate automatic location identification information, the wireless communication device 104 may be unable to make a telephone E911 call for emergency assistance. Thus, the person would not receive any assistance. However, with the alternate communication path, the wireless communication device 104 makes a telephone E911 call for emergency assistance via a radio frequency transceiver 209, to the controller 200, to the PSTN interface 224 over the communication channel 140 to reach the public safety answering point. Therefore, the person would still receive emergency assistance, as well as other types of location-based services.

In the preferred embodiment of the present invention, the location information system 102 is designed to operate according to the Bluetooth technology standard. Hence, the combination of the PSTN interface 224, the communication channel 140, and the location information system 102 designed to operate according to the Bluetooth technology standard advantageously provides the wireless communication device 104 to make and receive telephone communications over a Bluetooth communications network. In the Bluetooth communications network, the radio frequency transceiver 206-209 would act as communication base stations and the controller 200 would act as a communication switch having the software to appropriately route incoming or outgoing communications.

Alternatively, the PSTN interface 224 would not be needed if the Bluetooth communications network were intended to only be used by the location information system 102 within the facility.

Preferably, the communication path 140 would carry radio frequency signals operating in the 2.4 GHz range according the to the Bluetooth technology specification and the communication path 124 would carry radio frequency signals operating in the 800 MHz range according to cellular technology standards. Alternatively, the communication path 140 and the communication path 124 operate in the same frequency range. In this case, various frequency sharing or allocation plans may be implemented to provide efficient communications over the communication path 140 and the communication path 124.

Figure 3:
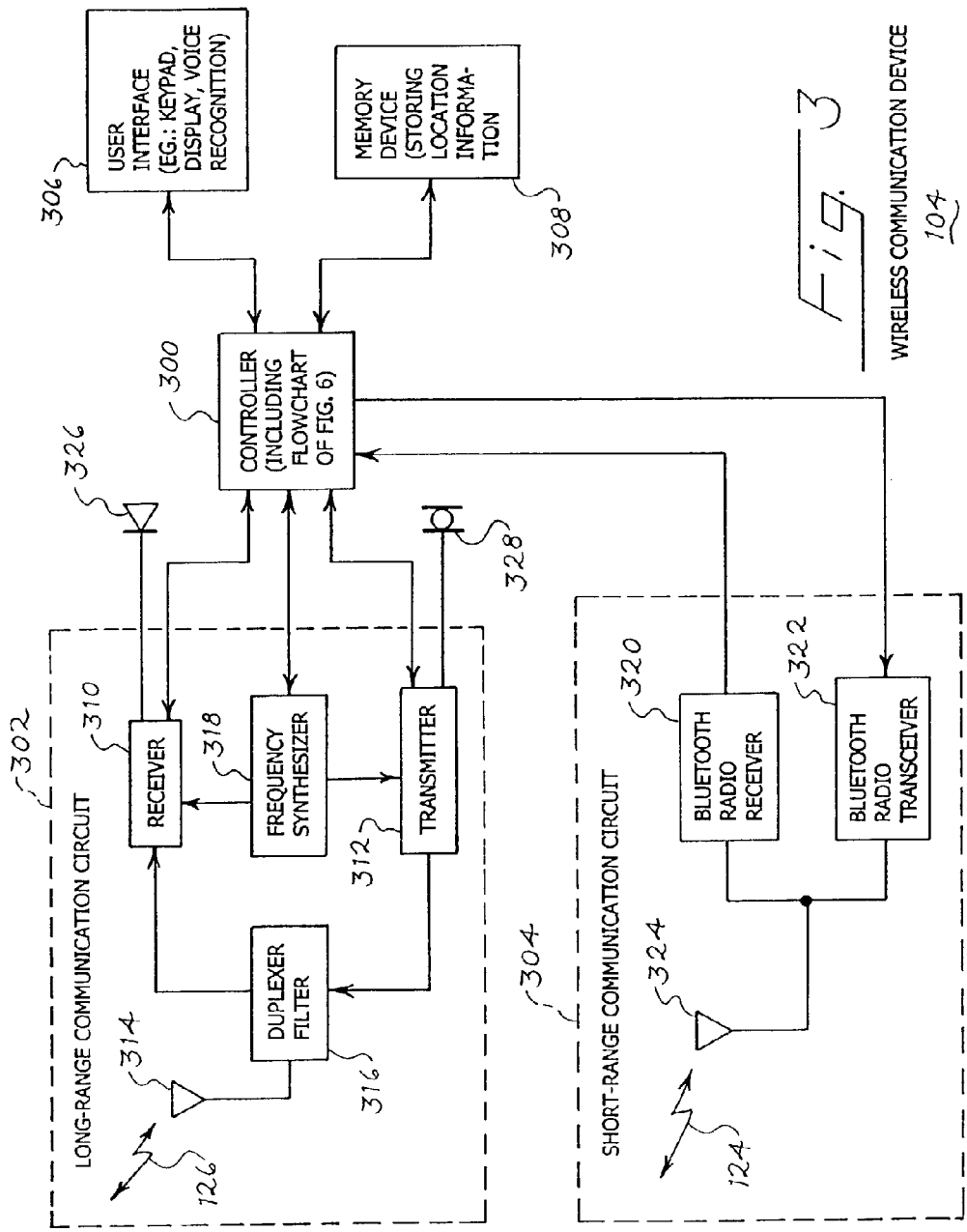
FIG. 3 illustrates a block diagram of the wireless communication device illustrated in FIG. 1 in accordance with a preferred embodiment of the present invention.

FIG. 3 illustrates a block diagram of the wireless communication device 104 illustrated in FIG. 1 in accordance with a preferred embodiment of the present invention. The wireless communication device 104 generally includes a short-range communication circuit 304, a long-range communication circuit 302, a controller 300, a memory device, a user interface 306, a speaker 326, and a microphone 328. The long-range communication circuit 302 further includes an antenna 314, a duplex filter 316, a receiver 310, a transmitter 312 and a frequency synthesizer 318. The short-range communication circuit 304 further includes an antenna 324, a receiver 320 and a transmitter 322.

The short-range communication circuit 304 receives location information from the location information system 102 over a short-range wireless communication channel 124 when the wireless communication device 104 is present in one of a plurality of predetermined areas 210-213 in the facility 110. Preferably, the short-range communication circuit 304 receives the location information at least one of before, during and after the wireless communication device 104 communicates an emergency telephone call to a public safety answering point associated with the wireless communication network 106. Preferably, each of the short-range communication circuit 304 and the location information system 102 further comprise a radio frequency transceiver designed to operate in accordance with a Bluetooth technology specification. Preferably, the short-range wireless communication channel 124 further comprises a radio frequency communication channel designed to operate in accordance with the Bluetooth technology specification.

The long-range communication circuit 302 sends the location information to the wireless communication network 106 over a long-range wireless communication channel 126 responsive to receiving the location information from the location information system 102. Preferably, the long-range communication circuit 302 is designed to send and receive cellular radio frequency signals.

The controller, coupled to each of the short-range communication circuit 304 and the long-range communication circuit 302, controls each of the each of the short-range communication circuit 304 and the long-range communication circuit 302.

The memory device 204, coupled to the controller, stores the location information responsive to receiving the location information from the location information system 102.

FIG. 4 illustrates a block diagram of the wireless communication network 106 illustrated in FIG. 1 in accordance with a preferred embodiment of the present invention. The wireless communication network 104 generally includes a base station 400, a communication switch or router 402, a memory device 408, a location-enabled service interface 410, a controller 406 and a public switch telephone network interface (PSTN) 418. The base station 400 further includes an antenna 416, a receiver 412 and a transmitter 414.

The antenna 416 communicates radio frequency signals over the radio frequency communication channel 126 between the wireless communication network 106 and a wireless communication device 104. The receiver 412, coupled to the antenna 416, receives the radio frequency signals from the wireless communication device 104. The transmitter 414, coupled to the antenna 416, transmits the radio frequency signals to the wireless communication device 104. The communication switch 402, coupled to the transmitter 414 and the receiver 412, routes information communicated over radio frequency communication channel 126. The memory device 408 stores the location information. The location-enabled service interface 410, preferably a PSTN interface, communicates signals between the wireless communication network 106 and the location-enabled service 108. The PSTN interface 418 communicates voice and/or data signals between the wireless communication network 106 and the location information system 102. The controller 406, coupled to the communication switch 402, the memory device 408, PSTN interface 418 and the location-enabled service interface 410, The location information of the wireless communication device 102 is transmitted over the paths 420-423. The service information from the location-enabled service 108 is transmitted over the paths 424-426.

FIG. 5 illustrates a flowchart 500 describing a method performed by the location information system 102 illustrated in FIG. 2 in accordance with a preferred embodiment of the present invention.

At step 502, the location information system 102 starts the method.

At step 504, the location information system 102 receives, from the location entry device 202, location information representing the plurality of location descriptions respectively associated with the plurality of predetermined areas 210-213 in the facility 110. Preferably, the location information is determined responsive to receiving GPS signals from global positioning satellites orbiting the earth, as described hereinabove. Alternatively, the location information is predetermined, as described hereinabove.

At step 506, the location information system 102 stores the location information in the memory device 204 responsive to the step 502 of receiving.

At step 508, the location information system 102 determines whether to provide the location information to the wireless communication device 104 unsolicited by the wireless communication device 104 or solicited by the wireless communication device 104 responsive to the step 506 of storing.

At step 510, the location information system 102 provides an availability of a location information service, having the location information, to the wireless communication device 104 in the facility 110 over the short-range wireless communication channel 126 responsive a determination at step 508 that the location information is solicited by the wireless communication device 104.

At step 512, the location information system 102 receives a request from the wireless communication device 104 over the short-range wireless communication channel 124 responsive to the step 510 of providing to determine whether a location information service is available to the wireless communication device 104 in the facility 110.

At step 514, the location information system 102 sends a response to the wireless communication device 104 over the short-range wireless communication channel 124 indicating that the location information service is available to the wireless communication device 104 in the facility 110 responsive to the step 512 of receiving the request.

Alternatively, at step 516, the location information system 102 broadcasts a signal to the wireless communication device 104 over the short-range wireless communication channel 124 responsive to the step 510 of providing to notify the wireless communication device 104 that the location information service is available to the wireless communication device 104 in the facility 110.

At step 518, the location information system 102 determines whether a request is received from the wireless communication device 104 for the location information over the short-range wireless communication channel 124 responsive to one of the step 514 of sending and the step 516 of broadcasting. The step of determining 518 is repeated when a request is not received from the wireless communication device 104 and when the location information is fixed, such as in a building. The step 504 of receiving the location information is repeated when a request is not received from the wireless communication device 104 and when the location information is variable, such as on a bus or a boat.

At step 520, the location information system 102 sends the location information to a wireless communication device 104 present in one of the plurality of predetermined areas 210-213 in the facility 110 over the short-range wireless communication channel 124 responsive to one of the step 518 of determining and the step 508 of determining that the location information is not solicited by the wireless communication device 104. As described hereinabove, the step 520 of sending is performed at least one of before, during and after the wireless communication device 104 communicates an emergency telephone call to the public safety answering point. The location information sent to the wireless communication device is used for an automatic location identification of the wireless communication device in the facility by the public safety answering point and emergency rescue personnel.

At step 520, the location information system 102 ends the method.

Note that the steps included within the dashed line indicated by reference number 524 are enhanced features of the location information system 102. In the preferred embodiment of the present invention, the most advantageous steps include steps 504, 506 and 520 to receive, store and send, respectively, the information signal. However, when the location information is determined in real time, the step 506 of storing may also be eliminated, since there would be no need to store the location information. Further, when the wireless communication device 104 has a location-based application software program carried with the wireless communication device 104 then the most relevant step needed would be only the step 504 of receiving the location information, Also note that steps included within dashed line indicated by reference number 526 generally describe a location information service available to people using compatible wireless communication devices 104 in the facility. The location information service may include, without limitation, a place finder in the facility (e.g. map service) to direct people to their room or seat, for example.

FIG. 6 illustrates a flowchart 600 describing a method performed by the wireless communication device 104 illustrated in FIG. 3 in accordance with a preferred embodiment of the present invention.

At step 602, the wireless communication device 104 starts the method.

At step 604, the wireless communication device 104 determines whether the location information is to be unsolicited by the wireless communication device 104 or solicited by the wireless communication device 104.

At step 606, the wireless communication device 104 determines whether an availability of service information, using the location information, is pushed to the wireless communication device 104 by the location-enabled service or pulled from the location-enabled service by the wireless communication device 104 in the facility 110 over the short-range wireless communication channel 126 responsive a determination at step 604 that the location information is solicited by the wireless communication device 104.

At step 608, the wireless communication device 104 sends a request to the location information system 102 over the short-range wireless communication channel 124 responsive to the step 606 of determining that the service information is pulled from the location-enabled service by the wireless communication device 104.

At step 610, the wireless communication device 104 receives a response from the location information system 102 over the short-range wireless communication channel 124 responsive to the step 608 of sending the request.

Alternatively, at step 612, the wireless communication device 104 receives a broadcast signal from the location-enabled service over the short-range wireless communication channel 124 responsive to the step 606 of determining that the service information is pushed to the wireless communication device 104 by the location-enabled service 108.

At step 614, the wireless communication device 104 sends a request to the location-enabled service for the location information associated with the predetermined area where the wireless communication device 104 is located in the facility 110 responsive to one of the step 610 of receiving and the step 612 of receiving. Preferably, the step 614 of sending is performed at least one of before, during and after the wireless communication device 104 communicates an emergency telephone call to a public safety answering point. The location information sent to the wireless communication device 104 is used for an automatic location identification of the wireless communication device 104 in the facility 110 by the public safety answering point and emergency personnel.

At step 616, the wireless communication device 104 receives the location information from the location information system 102 over the short-range wireless communication channel 124 when the wireless communication device 104 is present in one of the predetermined areas 210-213 in the facility 110 responsive to one of the step 614 of sending and the step 604 of determination that the location information is to unsolicited by the wireless communication device 104.

At step 618, the wireless communication device 104 stores the location information in the memory device 308 responsive to the step 616 of receiving.

At step 620, the wireless communication device 104 receives a request from the location-enabled service 108 for the location information stored in the memory device 308. Preferably, the request is received from the location-enabled service 108 via the wireless communication network 106 over the communication channel 126. Alternatively, the request is received from the location-enabled service 108 via the location information system 102 over the communication channel 140.

At step 622, the wireless communication device 104 sends the location information to the location-enabled service 108 responsive to the step 620 of receiving the location information. Preferably, the location information is sent to the location-enabled service 108 via the wireless communication network 106 over the communication channel 126. Alternatively, the location information is sent to the location-enabled service 108 via the location information system 102 over the communication channel 140.

At step 624, the wireless communication device 104 receives the service information related to the location information from the location-enabled service 108 responsive to the step 622 of sending the location information. Preferably, the service information is received from the location-enabled service 108 via the wireless communication network 106 over the communication channel 126. Alternatively, the service information is received from the location-enabled service 108 via the location information system 102 over the communication channel 140.

At step 626, the wireless communication device 104 ends the method.

Note that the steps included within the dashed line indicated by reference number 626 are enhanced features of the wireless communication device 104. In the preferred embodiment of the present invention, the most advantageous steps include steps 614, 616, 618, 620 and 622 to send a request for, receive, store, receive a request for, and send, respectively, the information signal. When the location information is determined in real time, the step 618 of storing may also be eliminated, since there would be no need to store the location information. The additional steps 622 and 624 are desirable when the wireless communication device 104 needs service information related to the its present information location, but is not necessary to only provide ALI to the public safety answering point during an emergency E911 call.

Also note that steps included within dashed line indicated by reference number 628 generally describe a location information service available to people using compatible wireless communication devices 104 in the facility 110. The location information service may include, without limitation, a place finder in the facility (eg. map service) to direct people to their room or seat, for example.

FIG. 7 illustrates a flowchart 700 describing a method performed by the wireless communication network 106 illustrated in FIG. 4 in accordance with a preferred embodiment of the present invention.

At step 701, the wireless communication network 106 starts the method.

At step 702, the wireless communication network 106 sends a request to the wireless communication device 104 for the location information stored in the wireless communication device 104. Preferably, the request is sent via directly from the wireless communication network 106 to the wireless communication device 104 over the communication channel 124. Alternatively, the request is sent via the location information system 102 to the wireless communication device 104 over the communication channel 140. At step 702, the request may be responsive to the wireless communication device 104 pulling service information from the location-enabled service 108 via the wireless communication network 106 or responsive to the location-enabled service 108 pushing the service information to the wireless communication device 104 via the wireless communication network 106.

At step 703, wireless communication network 106 receives the location information from the wireless communication device 104. Preferably, the location information is received from the wireless communication device 104 directly by the wireless communication network 106 over the communication channel 124. Alternatively, the location information is received from the wireless communication device 104 via the location information system 102 over the communication channel 140.

At step 704, wireless communication network 106 stores the location information in the memory device 408. The storage is relatively temporary, until the wireless communication network 106 receives updated location information from the wireless communication device 104.

At step 705, wireless communication network 106 sends the location information to the location-enabled service 108 over the communication channel 128.

At step 706, wireless communication network 106 receives the service information related to the location information from the location-enabled service over the communication channel 128.

At step 707, wireless communication network 106 sends the service information related to the location information to the wireless communication device 104. Preferably, the service information is sent via the wireless communication network 106 over the communication channel 126. Alternatively, the service information is sent via the location information system 102 over the communication channel 140.

At step 708, wireless communication network 106 ends the method.

FIG. 8 illustrates a flowchart 800 describing a method performed by the location-enabled service 108 illustrated in FIG. 1 in accordance with a preferred embodiment of the present invention.

At step 801, the location-enabled service 108 starts the method.

At step 802, the location-enabled service 108 sends a request to the wireless communication device 104 for the location information stored in the wireless communication device 104. Preferably, the request is sent via the wireless communication network 106 over the communication channel. Alternatively, the request is sent via the location information system 102 over the communication channel 140. At step 802, the request may be responsive to the wireless communication device pulling service information from the location-enabled service 108 or responsive to the location-enabled service 108 pushing the service information to the wireless communication device 104.

At step 803, the location-enabled service 108 receives the location information from the wireless communication device 104. Preferably, the location information is received via the wireless communication network 106 over the communication channel 128. Alternatively, the location information is received via the location information system 102 over the communication channel 140.

At step 804, the location-enabled service 108 stores the location information in the location-enabled service. The storage is relatively temporary, until the location-enabled service 108 receives updated location information from the wireless communication device 104.

At step 805, the location-enabled service 108 sends the service information related to the location information to the wireless communication device 104. Preferably, the service information is sent via the wireless communication network 106 over the communication channel 128. Alternatively, the service information is sent via the location information system 102 over the communication channel 140.

At step 806, the location-enabled service 108 ends the method.

In the preferred embodiment of the present invention, any feature described with reference to any drawing in the present application may be combined with any other feature described with reference to the same or any other drawing in the present application or the referenced co-pending application to provide multiple variations and combinations thereof.

Hence, while the present invention has been described with reference to various illustrative embodiments thereof, the present invention is not intended that the invention be limited to these specific embodiments. Those skilled in the art will recognize that variations, modifications and combinations can be made without departing from the spirit and scope of the invention as set forth in the appended claims.

The invention claimed is:

1. A computer-implemented method, performed by a location information system, comprising:
sending, at a processor of the location information system, location information over a short-range wireless communication channel to a wireless communication device present in a predetermined area in a facility, the location information informing the wireless communication device of a location of the wireless communication device in the facility;

wherein the location information is sent to the wireless communication device from a location in the facility other than the location of the wireless communication device in the facility.

2. The method of claim 1, further comprising:
receiving area-specific location information, including the location information sent to the wireless communication device, the area-specific location information representing a plurality of location descriptions associated respectively with a plurality of predetermined areas in the facility.

3. The method of claim 1, further comprising:
receiving a request to send location information to the wireless communication device;
wherein sending the location information to the wireless communication device comprises:
sending the location information to the wireless communication device in response to the request to send location information to the wireless communication device.

4. The method of claim 1, wherein sending the location information to the wireless communication device comprises:
sending the location information to the wireless communication device unsolicited by the wireless communication device.

5. The method of claim 1, further comprising:
receiving a request from the wireless communication device to determine whether a location information service is available to the wireless communication device in the facility; and
a processor of the location information system sending a response to the wireless communication device indicating that the location information service is available to the wireless communication device in the facility.

6. The method of claim 5, wherein the request from the wireless communication device is received over the short-range wireless communication channel and the response to the request is sent to the wireless communication device over the short-range wireless communication channel.

7. The method of claim 1, further comprising:
broadcasting a signal to the wireless communication device over the short-range wireless communication channel indicating that a location information service is available to the wireless communication device in the facility.

8. The method of claim 1, further comprising:
determining the location information based on received global positioning system signals.

9. The method of claim 1, wherein the short-range wireless communication channel is configured to operate in accordance with the Bluetooth technology specification.

10. The method of claim 1, wherein the wireless communication device comprises a cellular telephone.

11. A tangible computer-readable storage medium comprising a set of instructions for directing a processor to at least:
send location information to a wireless communication device present in a predetermined area in a facility over a short-range wireless communication channel, the location information informing the wireless communication device of a location of the wireless communication device in the facility;
wherein the location information is sent to the wireless communication device from a location in the facility other than the location of the wireless communication device in the facility.

12. The computer-readable storage medium of claim 11, further comprising a set of instructions to direct the processor to at least:
receive a request from the wireless communication device to determine whether a location information service is available to the wireless communication device in the facility; and
send a response to the wireless communication device indicating that the location information service is available to the wireless communication device in the facility.

13. The computer-readable storage medium of claim 11, further comprising a set of instructions to direct the processor to at least:
broadcast a signal to the wireless communication device over the short-range wireless communication channel indicating that a location information service is available to the wireless communication device in the facility.

14. The computer-readable storage medium of claim 11, wherein the short-range wireless communication channel is configured to operate in accordance with the Bluetooth technology specification.

15. The computer-readable storage medium of claim 11, wherein the wireless communication device comprises a cellular telephone.

16. A location information system comprising:
a wireless communication unit configured to send location information to a wireless communication device present in a predetermined area in a facility over a short-range communication channel, the location information informing the wireless communication device of a location of the wireless device in the facility, wherein the wireless communication unit sends the location information to the wireless communication device from a location in the facility other than the location of the wireless communication device in the facility.

17. The location information system of claim 16, further comprising:
a controller in communication with the wireless communication unit, the controller being configured to direct the wireless communication unit to send the location information to the wireless communication device in response to receipt of a request from the wireless to determine whether a location information service is available to the wireless communication device in the facility.

18. The location information system of claim 16, wherein the wireless communication unit broadcasts a signal to the wireless communication device of the short-range wireless communication channel indicating that a location information service is available to the wireless communication device in the facility.

19. The location information system of claim 16, wherein the wireless communication unit is configured to operate in accordance with the Bluetooth technology specification.

20. The location information system of claim 16, wherein the wireless communication device comprises a cellular telephone.

* * * * *